(12) United States Patent
Bartsch et al.

(10) Patent No.: US 7,607,197 B1
(45) Date of Patent: Oct. 27, 2009

(54) VACUUM CLEANER WITH OPERATING ELEMENTS THAT CONTROL POWER

(75) Inventors: Klaus Bartsch, Bielefeld (DE); Andreas Schmedt, Harsewinkel (DE); Udo Mersmann, Guetersloh (DE); Heinz Guenter Steinkoetter, Bielefeld (DE)

(73) Assignee: Miele & Cie. KG, Guetersloh (DE)

( * ) Notice: Subject to any disclaimer, the term of this patent is extended or adjusted under 35 U.S.C. 154(b) by 685 days.

(21) Appl. No.: 10/048,864

(22) PCT Filed: Sep. 14, 2000

(86) PCT No.: PCT/EP00/08962

§ 371 (c)(1),
(2), (4) Date: Mar. 6, 2002

(87) PCT Pub. No.: WO01/24678

PCT Pub. Date: Apr. 12, 2001

(30) Foreign Application Priority Data

Oct. 5, 1999 (DE) ................................. 199 47 980

(51) Int. Cl.
*A47L 9/28* (2006.01)
(52) U.S. Cl. ........................................ 15/413; 15/327.1
(58) Field of Classification Search .............. 15/327.1, 15/327.2, 327.6, 412, 413, 319
See application file for complete search history.

(56) References Cited

U.S. PATENT DOCUMENTS

| 4,577,365 | A | * | 3/1986 | Yuen | 15/339 |
| 4,642,841 | A | * | 2/1987 | Berfield et al. | 15/330 |
| 4,655,694 | A | * | 4/1987 | Berfield | 417/423.2 |
| 5,638,575 | A | * | 6/1997 | Sin | 15/413 |
| 5,701,631 | A | * | 12/1997 | Lindquist | 15/327.1 |

FOREIGN PATENT DOCUMENTS

| DE | 7408275 | | 9/1974 |
| DE | 36 03 176 | | 8/1987 |
| DE | 3603176 | | 8/1987 |
| DE | 9003938 | | 8/1991 |
| DE | 40 36 047 | * | 5/1992 |
| DE | 9309493 | | 11/1993 |
| DE | 9309493 | | 12/1993 |
| DE | 4302449 | | 8/1994 |
| DE | 44 26 634 | | 2/1996 |
| DE | 4426634 | | 2/1996 |
| DE | 19801468 | | 7/1999 |
| JP | 05-003846 | * | 1/1993 |

OTHER PUBLICATIONS

Computer generated English translation of JP 05-003846, Yoshimi et al., Jan. 1993.*

* cited by examiner

*Primary Examiner*—Laura C Guidotti
(74) *Attorney, Agent, or Firm*—Darby & Darby

(57) ABSTRACT

A vacuum cleaner includes a housing, inside of which is a suction chamber with a suction device and control electronics therein. A structural unit on the housing includes operating elements to operate the vacuum cleaner. There is an opening in the housing to the suction chamber. A support element is included that covers the opening. The support element includes contact strips providing electrical connection to the operating elements. There are plug-in connectors inside the housing connectable with the contact strip that provide a wired connection to the control electronics. The control electronics are cooled by an air stream resulting from the suction device.

13 Claims, 3 Drawing Sheets

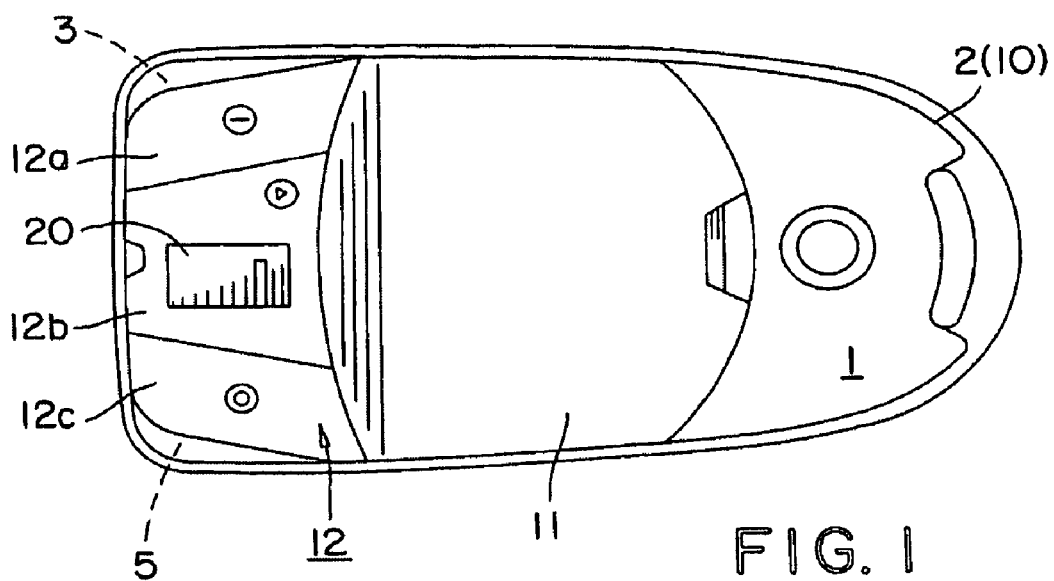
FIG. 1
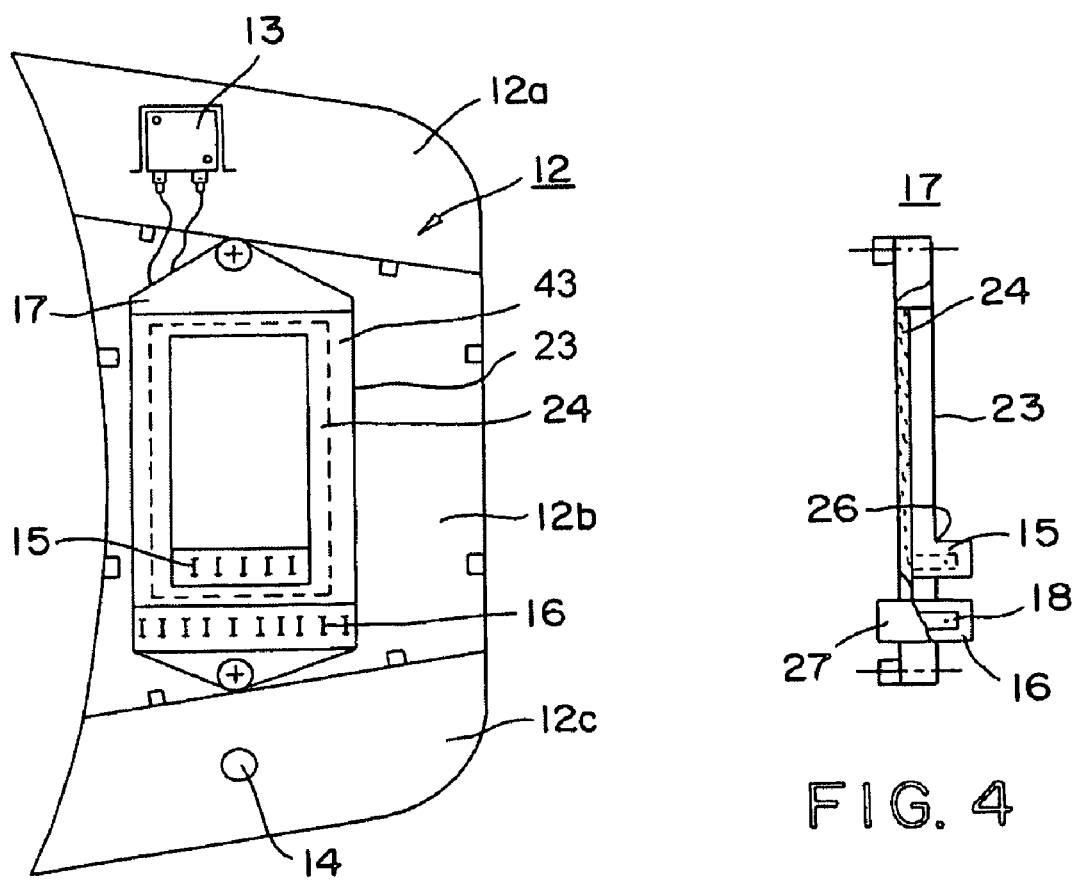
FIG. 3
FIG. 4

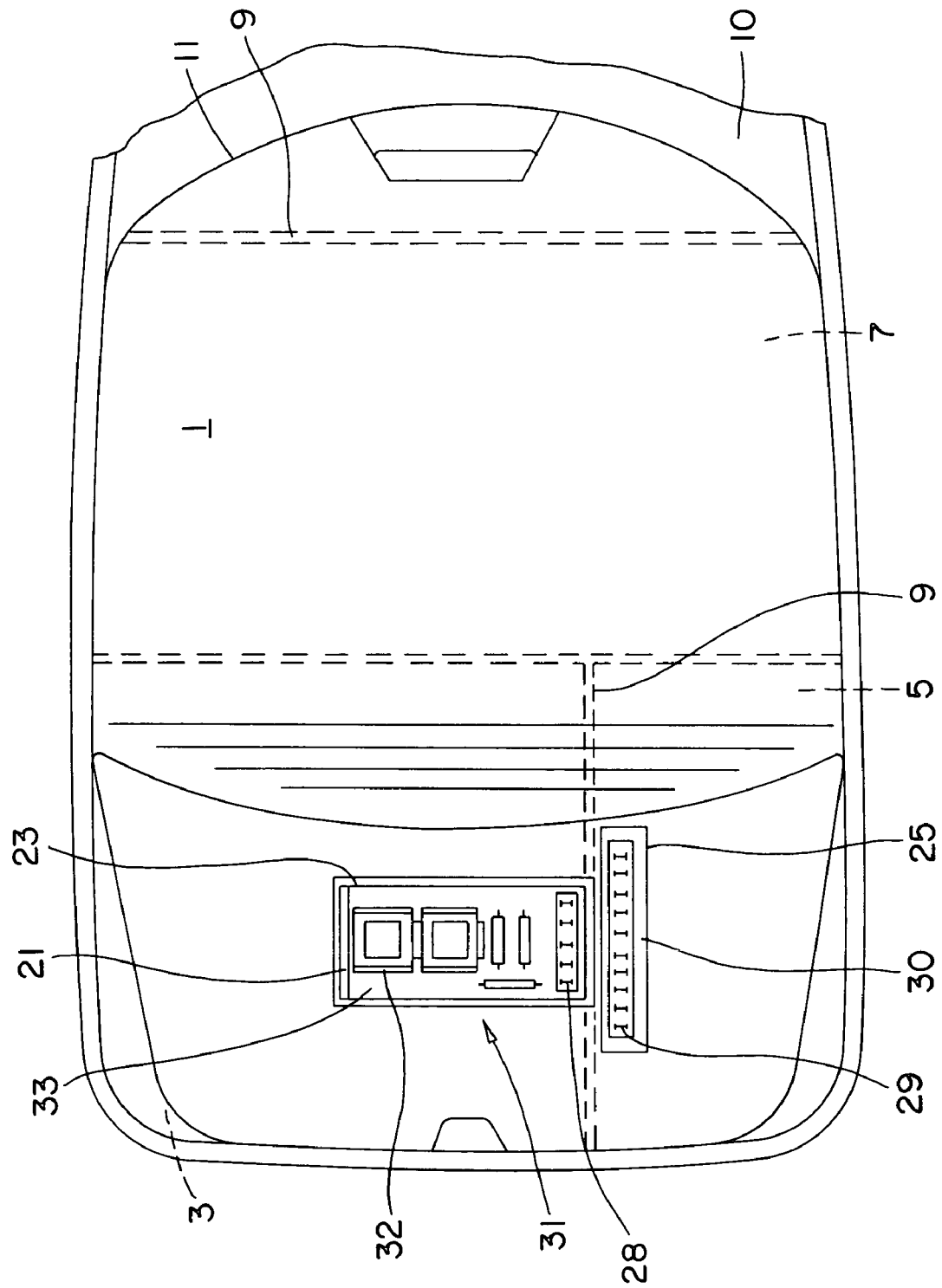

VACUUM CLEANER WITH OPERATING ELEMENTS THAT CONTROL POWER

Priority is claimed to German patent application DE 199 47 980.1, filed Oct. 5, 1999.

The subject matter of the invention relates to a vacuum cleaner, particularly a floor vacuum cleaner provided with a suction chamber in the apparatus housing for receiving a suction device as well as with operating elements on the housing for electrically controlling the output of the suction device, with the operating elements assembled as one structural unit being arranged above the apparatus housing which also receives the electronic control for the suction device.

BACKGROUND

Such vacuum cleaners (see German Patent 36 03 176 A1) consist of an upper housing section receiving the structural unit including the operating elements as well as of a lower section which is divided by separating walls into a dust collection chamber for the dust filter bag, the suction chamber and a housing chamber for a cable coil. In the assembled state, the separating walls are covered in an air-tight manner by the upper housing section with a lid hinged to the upper housing section sealing the dust collection chamber. In this context it is known to arrange the operating elements for controlling rotations and/or for energizing the apparatus as well as key for operating the cable winder as a single structural unit on an upper portion of the vacuum cleaner housing above the housing chamber for the suction device. In this arrangement, at least the keys positioned laterally of a center operating component are structured as kick pedals with large surfaces pivotally connected to the center component. The center component in essence receives rotational or slidable means for adjusting the output of the suction device which, in turn, is controlled by an electronic control disposed within the suction chamber (see German Patent 44 26 634 A1). An arrangement of the electronic control at the exterior of the suction chamber in the housing of the apparatus is also known (see German Utility Model 74 08 275). In this arrangement the electronic control is mounted on a printed circuit board or plate.

Furthermore, German Patent DE 93 09 493 describes a vacuum cleaner with a support plate which is attached to a cable drum which creates the electrical connection. The support plate also includes the components necessary for controlling the motor.

A significant drawback of the known arrangements is that the electrical connection between the circuit board of the electronic control arranged within the interior of the housing and the electrical switch and the output controls as well as visual indicators on the operating elements of the vacuum cleaner installed outside of the motor chamber have to be fabricated manually and in a time-consuming manner. The manual time-consuming wiring renders the assembly and fabrication sequence of the apparatus complex and may lead to wiring errors in case of personnel not specifically trained. This is particularly so with variants having operating elements which are country-specific or which are dependent upon given types of apparatus. Moreover, leaks may occur at wire passages between housing sections. In addition, because of tight installation conditions regarding the aspirator or the operating elements combined as operational groups, it is often a problem to arrange the electronic control with its power switches and associated cooling surfaces such that sufficient cooling is attained. In the state of the art (German Utility Model 74 08 275) in which the switch plate with its output control elements (triacs etc.) is arranged in its own chamber within the vacuum cleaner provided in its walls with cooling slots for ambient air, sufficient cooling is possible only because the cooling body of the power switch is made excessively large. However, modern compact and small vacuum cleaners lack sufficient space for such purposes. Moreover, the problem remains of time-consuming wiring of the vacuum cleaner electronics with its operating elements.

SUMMARY

It is an object of the invention in a vacuum cleaner of the kind referred to above to optimize wiring and braiding between the control electronics and the operating elements combined in a single structural unit and assembled separately from the electronic, in order on the one hand to reduce the mounting complexity and on the other hand to avoid cooling problems in connection with the power switches as well as leaks in the housing in consequence of line placements between different chambers. In this context, a uniform wiring principle for different variants of an apparatus of an assembly series is to be provided, the mounted operating elements defining the type and wiring errors being avoided.

The present invention provides a vacuum cleaner including: a suction device; a housing including a suction chamber receiving the suction device, and at least one opening to the suction chamber; control electronics disposed inside the suction chamber; a structural unit on the housing including at least one operating element thereon; a support element sealingly covering the at least one opening and including a contact strip providing electrical connection to the at least one operating element; and at least one plug-in connector in the housing connectable with the contact strip providing electrical connection to the control electronics.

BRIEF DESCRIPTION OF THE DRAWINGS

Novel features which are considered to be characteristic of the invention are set forth with particularity in the appended claims. The invention itself, however, in respect of its structure, construction and lay-out as well as manufacturing techniques, together with other objects and advantages thereof, will be best understood from the following description of preferred embodiments when read in connection with the appended drawings, in which:

FIG. 1 depicts top elevation of a floor vacuum cleaner provided with operating elements at the rear of the housing of the apparatus;

FIG. 2 is a top elevational view on an enlarged scale of the vacuum cleaner of FIG. 1 in partial section without operating elements;

FIG. 3 is a bottom view of the operating elements of the vacuum cleaner;

FIG. 4 is a support element for connection with the operating elements; and

DETAILED DESCRIPTION

Figure 5:
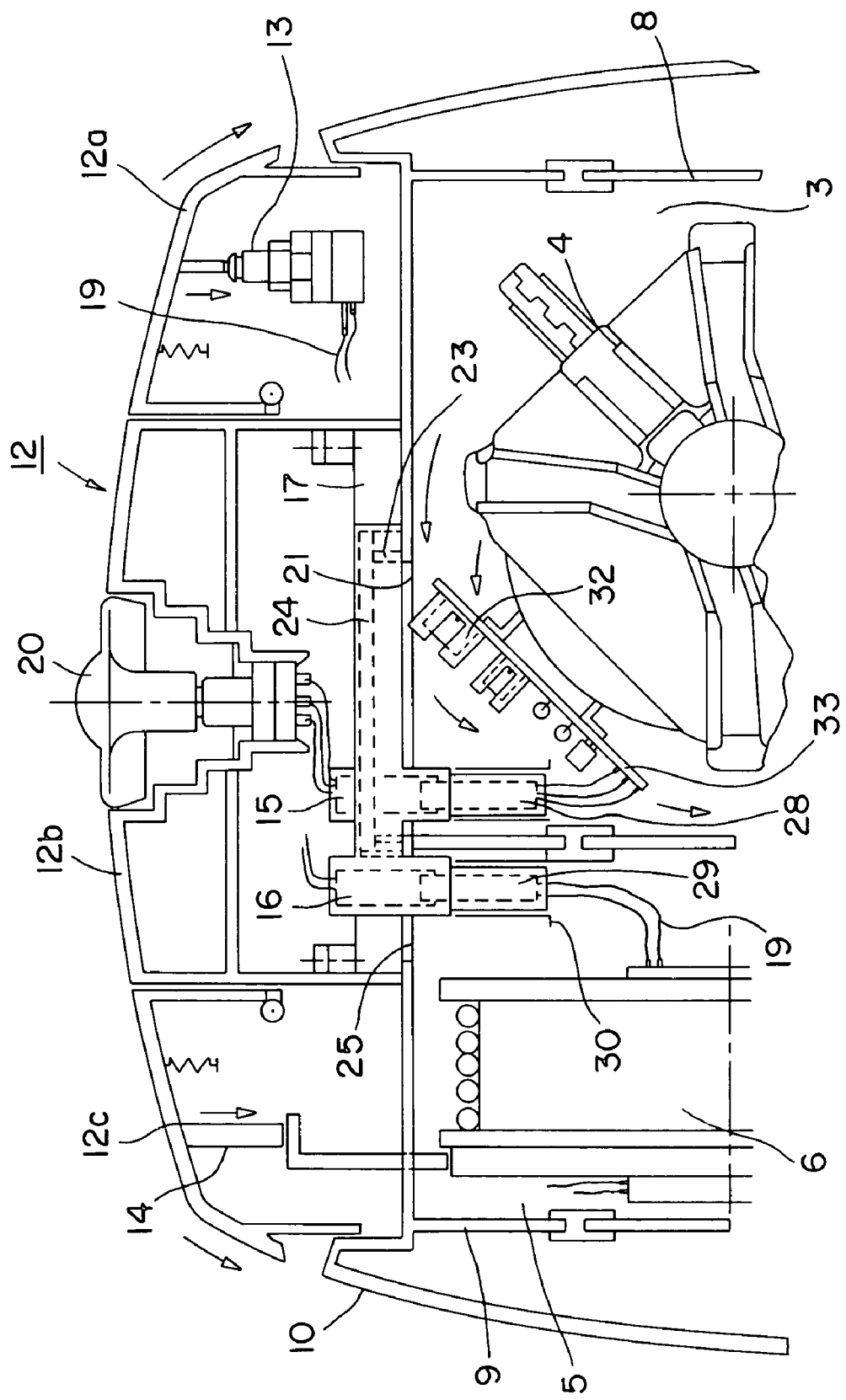
FIG. 5 is a cross-section of the apparatus housing of the floor vacuum cleaner adjacent to the operating elements.

A floor vacuum cleaner 1 shown in top elevation in FIG. 1 is provided with an apparatus housing 2 which is divided in a manner well known (see FIG. 2) into a suction chamber 3 for the suction device 4, a chamber 5 for a cable drum 6 for receiving the connection cable of the apparatus as well as a dust collection chamber 7 for receiving a dust filter bag. As shown in FIG. 5, the apparatus housing 2 consists of a lower section 8 provided with separating walls 9 for the previously mentioned chambers and of an upper section 10 of the housing tightly and releasably connected in a known manner with the lower section 8.

As shown in FIGS. 1, 2 and 3, there are provided in the closing upper housing section 10 provided with a pivotal lid 11 for changing the dust filter bag and above the suction chamber 3, operating elements 12; an operating element 12a for switching the vacuum cleaner 1 on and off, another operating element 12b for controlling the output via a power selection switch 20, and another operating element 12c for winding or unwinding the feed cable. The three operating elements 12 have been combined in a single structural unit and together extend over the width of the apparatus housing 2. The structural unit with the operating elements 12 consists of a separate middle piece 12b on which the power selection switch 20 and, optionally, control indicators and the like are mounted, as well as, on opposite sides of the middle piece 12b, operating elements 12a and 12c are form as rocking (see arrows, FIG. 5) switch keys structured as foot kick pedals. One of these kick pedals 12a serves to turn the apparatus on and off and is for this purposes provided at its bottom surface an appropriate switching device 13 such as, for instance, a micro switch. When actuated, the second key releases, by way of an integral actuating member 14, the brake of the cable drum 6.

As shown in FIGS. 3, 4 and 5 and in accordance with the invention, there is releasably connected to the bottom surface of the middle operating piece 12b of the structural unit a support element 17 provided with contact strips 15, 16. The support element 17 may optionally also support the electronics of the apparatus. The contact jacks 18 (see FIGS. 2 and 5) of the contact strips 15, 16 at the upper surface remote from the apparatus are connected by plugged conductor bridges 19 to the rotation adjustment or power selection switch 20, to separate indicator and control elements as well as to the on-off switch 13 of the structural unit of operating elements of the vacuum cleaner 1.

In accordance with the invention, the upper section 10 of the housing is provided with a defined opening 21 near the suction chamber 3. The upper margin of the opening 21 (see FIGS. 2 and 5) forms a circumferential land. The opening 21 is tightly covered by the support element 17 which for this purpose is structured as a lid with a circumferential marginal lip 23 (see FIGS. 3, 4 and 5). In the marginal lip 23, there is formed a gasket 43 which, after the support element 17 has been mounted, engages the margin of the opening 21. In addition, the support element 17 tightly covers a second opening 25 (see FIGS. 2 and 5) leading to the chamber 5 of the cable drum 6. FIG. 3 is a bottom view of the operating elements 12 of the floor vacuum cleaner, removed from the vacuum cleaner 1, with the support element 17 arranged at the middle operating element 12b.

The contact strips 15, 16 are seated in contact holders 26, 27 formed integrally with the support element 17 and are either cast into the holders or injection molded into them. Opposite the contact strips 15, 16, as seen in FIG. 5, plug-in connectors 28, 29 are arranged in the lower section 8 of the apparatus housing 2; they are releasably arranged in separate holders 30 in the suction chamber 3 and in chamber 5 for the cable drum 6. The plug-in connectors 28, 29 are accessible and viewable by way of the two housing openings 21, 25, the plug-in connectors 28, 29 corresponding to the contact strips 15, 16 being electrically connected to the control electronic 31 in the interior of the apparatus or the components thereof, to the suction device 4, the connector cable on the cable drum 6 as well as, optionally, to further electrical accessories in the interior of the floor vacuum cleaner 1.

In accordance with the invention, the suction device control electronic 31 and the cooling units 32 of the power switches of the rotation control, when the plugs are withdrawn, are arranged in the vicinity of the housing opening 21 of the suction chamber 3. When the support element 17 is tightly fitted onto the housing opening 21 (see FIG. 5) the electronic is fully subjected to the output air stream (see arrows, FIG. 5) and sufficiently cooled. The control electronic 31 is soldered to a plate 33 or circuit board preferably releasably mounted on the suction device 4 near the housing opening 21. At least the cooling surfaces or cooling units 32 of the power switches are arranged directly in the output air stream of the suction device 4.

In the illustrated embodiment, one contact strip 15 is protruding through the opening 21 into the suction chamber 3 (super pressure chamber), and, by way of the second opening 25 in the upper section 10 of the apparatus, the other contact strip 16 protrudes to the left of the separation wall 9 of the suction chamber 3 into the chamber 5 of the cable drum 6. The chamber 5 is conventionally exposed to ambient air. The further opening 25 is covered by the support element 17 but it is not sealed thereby. Only the contact strip 15 protruding into the suction chamber 3 is arranged within the area of the lid of the support element 17 enclosed by the seal 24 and sealed to the exterior.

The structural unit is exchangeably arranged at the upper section 10 of the housing, the elements of the structural units being preferably interconnected by releasable snap fit connectors. As has been mentioned, the operating elements 12 structured as kick or switching keys are rockingly connected to the common middle piece 12b of the structural unit, the middle piece 12b connected to the support element 17 being adapted to hold apparatus-specific rotation controls, indicator lamps and the like as well as, optionally, additional electronic components.

The invention makes it possible to optimize the wiring of floor vacuum cleaners in particular, the operating elements of which are combined in a structural unit. The support element 17 for electronic and plug-in components integrated, in accordance with the invention, in the structural unit (middle piece) makes for a simple and safe plug-in coupling of the separate motor electronics in the interior of the housing with the "capped" or operating electronic at the exterior of the housing chambers, thus preventing wiring errors during the assembly process. As a separate plug-in connector the support component 17 further provides for a simple controlled accommodation of the power switches or their cooling vanes 32 directly in the air stream of the suction device 4. Leaks in the housing are no longer possible since separate leads through housing walls between blower and cable drum chambers are no longer necessary in consequence of the plug-in arrangement. Also, because of their direct exposure to the blower air stream, cooling problems in connection with the power switches no longer occur.

In accordance with a further embodiment of the invention not shown in detail, the control electronics or the rotation control of the vacuum cleaner may be provided directly on the support component 17 together with the power switches and their associated cooling vanes 32 and the like. In such a variant, the electrical components of the power control are to be mounted on a separate circuit plate on the support element 17 over the opening to the suction chamber 3. When the support element 17 or middle piece of the structural unit is assembled, at least the electronic power switches and their cooling vanes are to protrude sufficiently into the opening 21 to the suction chamber to be optimally exposed to blower air. To ensure a tight seal of the support plate it may be necessary to injection mold the electronic components into the support element 17 and to solder the plate or circuit board to the injected components. As an alternative to an injected power switch (triac) with cooling vanes it is also conceivable to injection mold only the cooling unit and two contacts. The triac will then be attached to the cooling unit for subsequent soldering with the contacts.

Moving the control electronics of the vacuum cleaner into the structural unit of the operating elements 12 also offers the possibility of variably to structure the apparatus. More particularly, it would be possible to select, with the same control electronics, an unchanging wiring principle for apparatus of a manufacturing series. A given type of apparatus is then defined by the applied combination of operating keys. For different manufacturing series of vacuum cleaners middle pieces 12*b* of the same width or the same size may be combined with larger or smaller switching keys 12*a*, 12*c* of the same width, the electronics of the middle piece 12*b* defining the type of apparatus.

The invention claimed is:

1. A vacuum cleaner comprising:
 a suction device;
 a housing including:
  a suction chamber receiving the suction device, and
  at least one opening to the suction chamber;
 control electronics disposed inside the suction chamber;
 a structural unit on the housing including at least one operating element thereon;
 a support element sealingly covering the at least one opening and including a contact strip providing electrical connection to the at least one operating element; and
 at least one plug-in connector in the housing connectable with the contact strip providing electrical connection to the control electronics,
 wherein the control electronics are disposed inside the suction chamber so as to be cooled by an output air stream of the suction device and include power switch cooling units cooled by the output air stream.

2. A vacuum cleaner comprising:
 a suction device;
 a housing including:
  a suction chamber receiving the suction device, and
  an opening to the suction chamber;
 a structural unit disposed over the suction chamber and including operating elements, the operating elements including:
  a middle piece having at least one of a power switch and indicator element; and
  a switching key supported by the middle piece and operable for switching the suction device on and off;
 control electronics and a cooling unit of the power switch disposed inside the suction chamber in a vicinity of the opening so as to be cooled by an output air stream of the suction device;
 a support element disposed at a bottom surface of the middle piece and sealingly covering the opening, the support element including a contact strip providing electrical connection to at least one of the operating elements; and
 at least one plug-in connector disposed in the housing and cooperating with the contact strip so as to provide electrical connection to at least one of the control electronics, the suction device and a cable drum disposed in the housing.

3. The vacuum cleaner recited in claim 2 wherein the support element includes a marginal lip having a surrounding gasket.

4. The vacuum cleaner recited in claim 2 wherein the contact strip is received in a plug holder integrally formed in the support element.

5. The vacuum cleaner recited in claim 4 wherein the contact strip is inseparably set in the plug holder.

6. The vacuum cleaner recited in claim 4 wherein the contact strip and plug holder are mounted by injection molding.

7. The vacuum cleaner recited in claim 2 wherein the at least one plug-in connector includes a first and a second plug-in connector releasably disposed opposite the contact strip, the first plug-in connector being disposed within a first holder in the suction chamber and the second plug-in connector being disposed in a second holder in the cable drum chamber.

8. The vacuum cleaner recited in claim 2 wherein the control electronics are disposed on a circuit board releasably mounted on the suction device, and wherein the cooling unit includes a cooling vane disposed directly in the output air stream of the suction device.

9. The vacuum cleaner recited in claim 2 further comprising further electronic components provided on a circuit board arranged on the support element.

10. The vacuum cleaner recited in claim 2 wherein the housing includes an upper housing having the structural unit disposed thereon and a lower housing including separating walls dividing the suction chamber from a dust collection chamber and a drum chamber receiving the cable drum, and wherein the upper housing sealingly covers the separating walls and includes an opening for the contact strip.

11. The vacuum cleaner recited in claim 10 wherein the structural unit is exchangeably mounted on the upper section of the housing.

12. The vacuum cleaner recited in claim 2 wherein the switching key is snap-connected to the middle piece in a rocking manner.

13. The vacuum cleaner recited in claim 2 wherein the control electronics and cooling unit are disposed on the support element, and wherein the cooling unit includes a cooling vane disposed, in an assembled state of the support element, so as to protrude into the output air stream of the suction device.

* * * * *